W. E. ERWIN.
TIRE RIM.
APPLICATION FILED AUG. 16, 1916.

1,282,713.

Patented Oct. 22, 1918.

WITNESSES:
Charles Robeles
Thos Castberg

INVENTOR
William Everett Erwin,
BY Strong & Townsend
ATTORNEYS

UNITED STATES PATENT OFFICE.

WILLIAM EVERETT ERWIN, OF BERKELEY, CALIFORNIA.

TIRE-RIM.

1,282,713.

Specification of Letters Patent.

Patented Oct. 22, 1918.

Application filed August 16, 1916. Serial No. 115,180.

*To all whom it may concern:*

Be it known that I, WILLIAM EVERETT ERWIN, a citizen of the United States, residing at Berkeley, in the county of Alameda and State of California, have invented new and useful Improvements in Tire-Rims, of which the following is a specification.

The object of this invention is to provide a demountable rim (either straight side or clencher type) which can be easily and quickly applied to or removed from a tire.

The demountable rims now in use are generally made in one piece with split ends adapted to be sprung apart to permit application and removal of the rim to and from the tire. There is very little contraction permitted by this construction and therefore the flanges of the rim do not easily clear the tire, and great force must be exerted to apply or remove the rim. Considerable time is therefore required for this operation, and moreover there is a great stress thrown upon the flanges of the tire which results in early warping and wear of the tire. Any improvement whereby to lessen the labor and time required to apply or remove these rims and prevent the unnecessary wear and destruction of the tire, would fill a long felt want on the part of the automobile operator.

In my invention I employ a plurality of hinged segments, preferably two long and two short, the short segments having their ends abutting and disconnectible from each other, whereby the free ends may be moved inwardly to permit collapsing of the entire rim and consequent easy removal thereof from the tire. Also I employ guide means for causing the free ends of the short segments to come automatically into abutment when the rim is collapsed so that an outward pressure on the meeting ends of these segments will serve to expand the rim into circular form, where it engages the tire, and locking means for positively retaining the parts in expanded position.

One form which my invention may assume is exemplified in the following description illustrated in the accompanying drawing, in which:—

Figure 1:
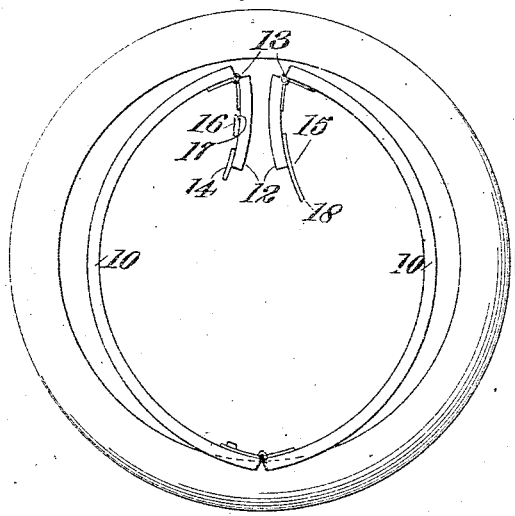
Figure 1 shows a side elevation of a tire equipped with a rim embodying my invention, the rim being shown in collapsed position.

In the particular form illustrated in the drawing, I employ a plurality of arcuate sections, two comparatively long ones 10 connected together by a hinge 11, and two short sections 12 each connected by a hinge 13 to one of the long sections, the short sections having their adjacent ends disconnectible and adapted to abut each other when the rim is expanded into circular form. By moving the free ends of the short sections inwardly, a complete collapse of the rim as shown in Fig. 1 is obtained, and by making these members comparatively short, there is a minimum of end-thrust tending to abnormally expand the rim when the abutting ends of said members are brought into a straight line with the hinges 13.

Figure 2:
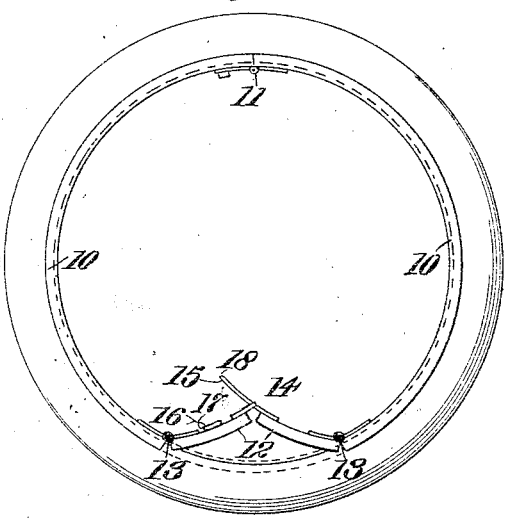
Fig. 2 shows a similar view of a tire and a rim, the solid lines showing the parts in position for expansion, and the dotted lines showing the same in expanded position.
Figure 3:
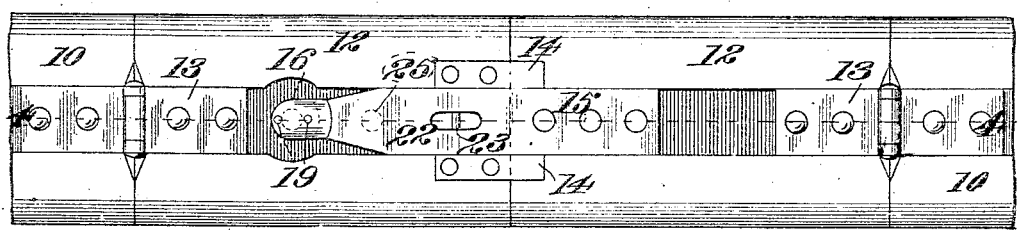
Fig. 3 shows a plan view in detail, illustrating the locking and guiding means employed in my rim.
Figure 4:
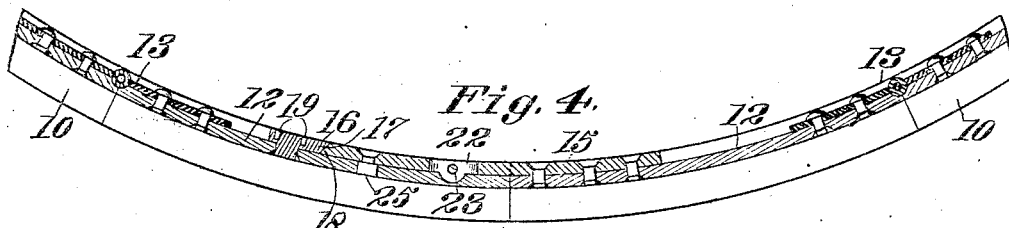
Fig. 4 shows a sectional view of the same taken on a line 4—4 Fig. 3.
Figure 5:
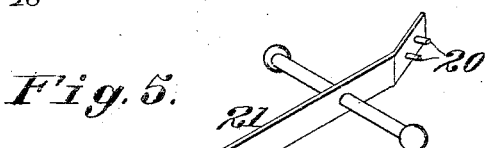
Fig. 5 shows a perspective view of a preferred form of tool for locking and unlocking the rim.

To expand the rim I utilize the short sections 12 in toggle arrangement, and thus simplify and facilitate the operation. For this purpose I provide guide members 14 and 15, one on each short section and rigidly connected therewith by bolts or rivets. The member 14 is preferably bifurcated or made in two parts, and the member 15 preferably consists of a single strap somewhat longer than the member 14 and adapted to enter the bifurcation, the two members crossing each other when brought in juxtaposition as shown in Fig. 2. The operator, by pressing outwardly on the meeting ends of the short sections will thus be enabled to expand the parts into circular form. In the latter position the members 14 and 15 overlap, the member 15 lying between the parts of the member 14 as shown in Fig. 3. The said member 15 extends into juxtaposition with a keeper, the latter in the form of an eccentric button 16 having a beveled and arcuate end 17 to engage with and overlie a beveled and arcuate end 18 on the member 15. Holes 19 are preferably formed in the button to receive pins or projections 20 on one end of a tool 21 (shown in Fig. 5) whereby to permit turning of the button for locking and unlocking the parts. The intermediate portion of the member 15 is preferably fitted with a slot 22 having a cross-pin 23 whereby a hook 24 on the opposite end of the tool 21 may be inserted to pry the short sections apart when removing the rim. For the purpose of preventing the separation of the ends of the short sections 12, I employ a pin or projection 25 adapted to enter a depression or opening in the opposite section 12 when the parts are brought into expanded position.

To remove the rim, the operator inserts the hook 24 in the slot provided therefor so that the shoulder thereon rests against the underlying short section and the hook engages the cross-pin 23, then by using the tool as a lever, the short sections are moved apart. When their meeting ends have passed the point in a straight line with the hinges 13, the entire rim may readily be collapsed as shown in Fig. 1. This operation requires but a few seconds time. In applying the rim to a tire, it is placed within the tire and the whole then stood upright with the short sections positioned at the bottom. The free ends of the short sections are then moved into engagement and automatically assume the proper abutting position on account of the guide members 14 and 15. The operator then with his foot may press outwardly on the meeting ends of the short sections, whereupon the latter act as a toggle to expand the rim into circular form. The projection 25 will, without attention, enter its opening or depression, and the button 16 is then turned to lock the parts in position. The fact that no pounding, pulling, or straining of the parts is necessary, insures a much easier and quicker operation. In fact the operation is smooth and mechanical in all respects. When expanded and locked the rim is as secure as any one piece construction.

Carried on a spare tire there is no possibility for this rim to become loosened or to rattle, and all parts are securely interlocked and connected. It is important in a rim of this type to keep the free ends of the short segments in proper abutting relation when expanded as otherwise the rim is liable to collapse. The overlapping guide members, the locking button, and the projection 25 insure a constant abutting engagement of the free ends of these segments in expanded position.

My invention may be applied to or embodied in any form of demountable rim whether straight side or clencher type, and various changes in the construction and arrangement of the several parts may be employed without departing from the spirit of my invention as disclosed in the appended claims.

To insure the best action of the hinged sections, the pivotal axes of the hinges should be in line with the inner circumference of the rim. This may be accomplished by cutting away the inside corners of the connected ends to permit countersinking of the hinge bearing. Where the hinge centers are set inwardly from the annulus of the rim there is a wide separation of the connected ends of the arcuate sections when the latter are collapsed, resulting in an unnecessarily large expansion of the rim at the time the short segments have their ends in a straight line.

Having thus described my invention what I claim and desire to secure by Letters Patent is:—

1. A rim comprising a series of arcuate hinge sections forming an annular rim, two adjacent sections being comparatively short and abutting against each other having a hinged connection whereby they may be completely separated to collapse the rim, an arcuate comparatively long tongue member secured to one of said sections and adapted to overlap the other of said sections, and overhanging guide plates secured to the adjacent end of the other section and between which the tongue member is adapted to extend and whereby the two hinged sections may be allowed swinging movement in relation to each other while held in alinement by the tongue and guide members.

2. A demountable rim comprising a series of arcuate rim sections hinged together to form a complete annular rim, two adjacent sections being comparatively short and abutting against each other having a hinge connection whereby they may swing freely in relation to each other, a pair of arcuate guide plates fixed in spaced parallel relation to each other upon one of said short rim sections and adapted to overhang the other of said sections, a comparatively long arcuate tongue secured to said second named section and overlapping the first section to lie between the guide members, a latch on one of the plates whereby the tongue may be rigidly locked to form a rigid joint between the short rim sections, and a tool-engaging portion upon said tongue whereby the joint in the tire sections may be broken to collapse the rim and remove a tire therefrom.

3. A demountable rim comprising a series of arcuate sections hinged together, two adjacent sections being comparatively short and having their abutting ends disconnectible to permit complete separation thereof for collapsing the rim, coöperating guide means associated with the free ends of said short sections to retain them in abutting relation when in collapsed position and disposed at the lower portion of the rim so that a downward pressure at the meeting ends of said sections may be utilized to expand the parts into circular form, said guide means comprising a projecting member rigid with one of said short sections on the inner face thereof, and means on the other short section to receive said projecting member, said projecting member having means to receive a tool whereby the hinged sections may be moved angularly inward for collapsing the rim.

4. A demountable rim comprising a series or arcuate sections hinged together, two adjacent sections being comparatively short and having their abutting ends disconnectible to permit complete separation thereof for collapsing the rim, coöperating guide means associated with the free ends of said short sections to retain them in abutting relation when in collapsed position and disposed at the lower portion of the rim so that a downward pressure at the meeting ends of said sections may be utilized to expand the parts into circular form, said guide means comprising a projecting member rigid with one of said short sections on the inner face thereof, means on the other short section to receive said projecting member, and a pin on said projecting member arranged to enter a depression in the opposite short section to lock said parts against circumferential separating movement.

In testimony whereof I have hereunto set my hand in the presence of two subscribing witnesses.

WILLIAM EVERETT ERWIN

Witnesses:
JOHN H. HERRING,
WILLIAM D. KELLEY.